(12) United States Patent
Slave (10) Patent No.: US 11,034,383 B2
(45) Date of Patent: Jun. 15, 2021

(54) VEHICLE INCLUDING SECOND STEERED AXLE

(71) Applicant: Ford Global Technologies, LLC, Dearborn, MI (US)

(72) Inventor: Renato Bernardinetti Slave, Sao Paulo (BR)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 16/054,662

(22) Filed: Aug. 3, 2018

(65) Prior Publication Data

US 2020/0039581 A1 Feb. 6, 2020

(51) Int. Cl.
*B62D 7/15* (2006.01)
*B62D 7/14* (2006.01)
*B60B 35/00* (2006.01)
*B62D 15/02* (2006.01)

(52) U.S. Cl.
CPC .......... *B62D 7/1545* (2013.01); *B60B 35/003* (2013.01); *B62D 7/144* (2013.01); *B62D 7/159* (2013.01); *B62D 7/1509* (2013.01); *B62D 7/1581* (2013.01); *B62D 15/022* (2013.01)

(58) Field of Classification Search
CPC .... B62D 7/1545; B62D 7/1509; B62D 7/144; B62D 7/1581; B62D 15/022; B62D 7/159; B62D 6/007; B62D 5/04; B62D 15/021; B60B 35/003; B60Y 2200/14
See application file for complete search history.

(56) References Cited

U.S. PATENT DOCUMENTS

| 4,782,907 | A * | 11/1988 | Morishita | B62D 7/148 180/412 |
| 6,131,691 | A * | 10/2000 | Morch | B62D 13/00 180/412 |
| 6,341,251 | B1 * | 1/2002 | Enomoto | B62D 7/144 701/41 |
| 7,204,341 | B2 * | 4/2007 | Lundmark | B60G 7/008 180/402 |
| 7,575,089 | B2 * | 8/2009 | Sherwin | B60T 8/1755 180/411 |
| 8,534,414 | B2 * | 9/2013 | Williams | B62D 5/003 180/402 |

(Continued)

FOREIGN PATENT DOCUMENTS

| CN | 106864591 A | 6/2017 |
| CN | 107685767 A | 2/2018 |

(Continued)

OTHER PUBLICATIONS

Robert Bosch GmbH, "Rear Axle Steering System, Electrohydraulic Steering Assistance for Multi-Axle Vehicles", retrieved from the Internet URL: https://www.bosch-mobility-solutions.com (9 pages).

*Primary Examiner* — Kevin Hurley
*Assistant Examiner* — Marlon A Arce
(74) *Attorney, Agent, or Firm* — Ray Coppiellie; Bejin Bieneman PLC (57) ABSTRACT

A vehicle includes a first steered axle and a second steered axle behind the first steered axle. The second steered axle is steerable independently from the first steered axle. The vehicle includes wheels on the second steered axle. An electric steering motor is connected to the at least one of the wheels.

18 Claims, 7 Drawing Sheets

(56) References Cited

U.S. PATENT DOCUMENTS

| | | | |
|---|---|---|---|
| 8,833,504 B2 * | 9/2014 | Williams | B62D 5/0484 |
| | | | 180/408 |
| 9,452,779 B2 | 9/2016 | Blond et al. | |
| 9,932,068 B2 * | 4/2018 | Oh | B62D 5/09 |
| 2003/0028301 A1 * | 2/2003 | Sebastian | B62D 7/159 |
| | | | 701/41 |
| 2007/0169969 A1 * | 7/2007 | Hummel | B62D 7/144 |
| | | | 180/24.01 |
| 2015/0307128 A1 * | 10/2015 | Blond | B62D 7/144 |
| | | | 701/42 |
| 2017/0327147 A1 | 11/2017 | Hofmann et al. | |

FOREIGN PATENT DOCUMENTS

| | | |
|---|---|---|
| DE | 102012202497 A1 | 5/2014 |
| EP | 0930218 A2 | 7/1999 |
| EP | 2767455 A2 | 8/2014 |

\* cited by examiner

VEHICLE INCLUDING SECOND STEERED AXLE

BACKGROUND

Some vehicles include a plurality of axles. The axles are supported by a frame of the vehicle and wheels are connected to the axles. Axles can be steered axles or straight axles. Steered axles move steer the wheels to control the driving direction of the vehicle. Input to steer the wheel may be provided by the rotation of a steering wheel by a driver of the vehicle. On straight axles, the wheels are not steerable, but instead are fixed in a forward direction.

Often, the front-most axle of the vehicle is a steered axle. Under some conditions when the vehicle is powered forward while the wheels on the front axle are turned, wheels on rear axles may be dragged along the driving surface. This results in premature wear of the tires on the wheels on the rear axle.

DETAILED DESCRIPTION

A vehicle comprising a first steered axle. A second steered axle is behind the first steered axle and is steerable independently from the first steered axle. Wheels are on the second steered axle. An electric steering motor connected to the at least one of the wheels.

The vehicle may include a processor and a memory storing instructions executable by the processor to instruct the electric steering motor to steer the at least one of the wheels. The processor may instruct the electric steering motor to steer the second steered axle at a different steering angle than a steering angle of the first steered axle.

The vehicle may include a steering-wheel angle sensor configured to measure a rotational position of the steering wheel. The memory may store instructions executable by the processor to instruct the electric steering motor based at least on the rotational position of the steering wheel measured by steering-wheel angle sensor. The memory may store instructions executable by the processor to instruct the electric steering motor based at least on a speed of the vehicle.

The vehicle may include a housing and a steering wheel rotatable relative to the housing. The steering-wheel angle sensor may be fixed to the housing and is configured to detect the rotational position of the steering wheel relative to the housing.

The vehicle may include a hydraulic actuator connected to the first steered axle. The vehicle may include a steering wheel, the hydraulic actuator being between the steering wheel and the first steered axle.

The vehicle may include a third axle, the second steered axle being between the first steered axle and the third axle.

The vehicle may include a frame, the electric steering motor being fixed to the frame.

The electric steering motor may be operably connected independently to both of the wheels.

The vehicle may include a gearbox connected to the electric steering motor, the gearbox including a shaft connected to one of the wheels and another shaft connected to the other of the wheels. The vehicle may include a stub axle connected to each of the wheels, a link connecting one of the stub axles to one of the shafts, and another link connecting the other of the stub axles to the other of the shafts.

The vehicle may include a track rod between the wheels, wherein the steering motor steers one of the wheels and a track rod steers the other of the wheels.

The vehicle may include a stub axle connected to each wheel, the electric steering motor being connected to the stub axle.

The vehicle may include a link between the electric steering motor and the stub axle.

A system of the vehicle includes a processor and a memory storing instructions executable by the processor to: receive a steering wheel angle measurement; calculate a desired steering angle of a second steered axle based at least on the steering wheel angle measurement, the second steered axle being behind a first steered axle; and instruct a motor to turn the second steered axle to the desired steering angle independently of the steered angle of the first steered axle.

The memory may store instructions executable by the processor to receive a vehicle speed and calculate the desired steering angle of the second steered axle based at least on the vehicle speed.

The memory may store instructions executable by the processor to receive a mode selection and calculate the desired steering angel of the second steered axle based at least on the mode selection.

With reference to the Figures, wherein like numerals indicate like parts throughout the several views, a vehicle 10 includes a first steered axle 12 and a second steered axle 14 behind the first steered axle 12. The second steered axle 14 is steerable independently from the first steered axle 12. An electric steering motor 16 steers the second steered axle 14. The vehicle 10 includes a processor 18 and a memory 20 storing instructions executable by the processor 18 to receive a steering wheel angle measurement, calculate a desired steering angle of a second steered axle 14 based at least on the steering wheel angle measurement, and instruct the electric steering motor 16 to turn the second steered axle 14 to the desired steering angle independently of the steering angle of the first steered axle 12.

The operation of the electric steering motor 16 to steer the second steered axle 14 independently of the first steered axle 12 allows for the second steered axle 14 to be steered at an angle that reduces tire wear on the second steered axle 14. As set forth below, the calculation of the desired steering angle of the second steered axle 14 may be designed to reduce or eliminate drag of wheels 22 of the second steered axle 14 during turning to reduce wear of the wheels 22 of the second steered axle 14. The steering of the second steered axle 14 with the electric steering motor 16 eliminates or reduces hydraulic components, mechanical linkages, etc., to steer the second steered axle 14, which may reduce cost. The elimination or reduction of hydraulic components, mechanical linkages, etc., to steer the second steered axle 14 reduces packaging constraints for steering of the second steered axle 14 and may allow for easier packaging of other components.

The vehicle 10 may be any passenger or commercial automobile such as a car, a truck, a sport utility vehicle, a crossover vehicle, a van, a minivan, a taxi, a bus, etc. As an example, the vehicle 10 shown in FIG. 1 is a semi-trailer tractor for hauling freight in cargo trailers.

Figure 1:
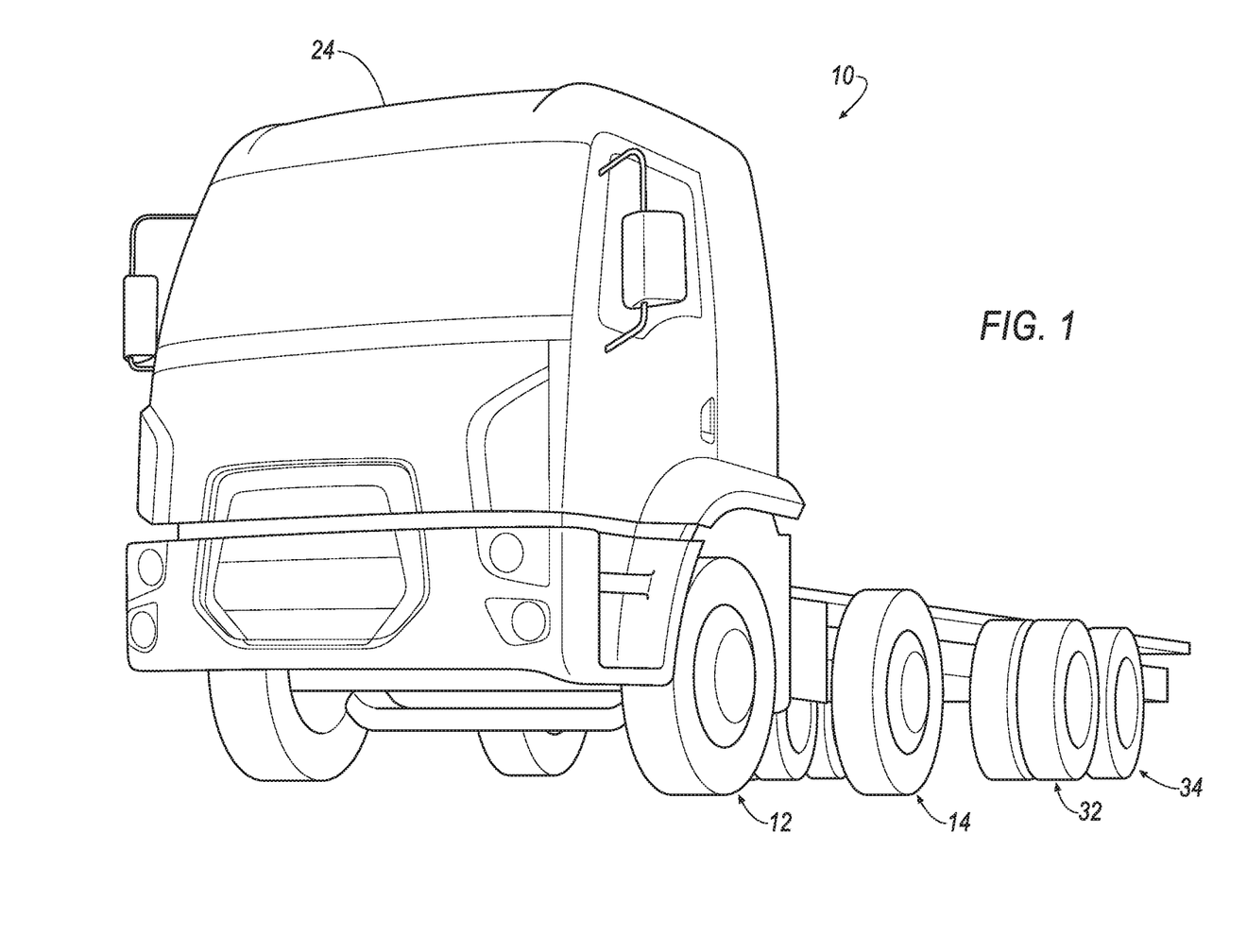
FIG. 1 is a perspective view of a vehicle including a first steered axle and a second steered axle.

With reference to FIG. 1, the vehicle 10 may include a body 24 and a frame 26. The body 24 and frame 26 may have a body-on-frame construction (also referred to as a cab-on-frame construction). In other words, the body 24 and frame 26 are separate components, i.e., are modular, and the body 24 is supported on and affixed to the frame 26. In the body-on-frame construction, the frame 26 may include rails 28 elongated in a vehicle fore-aft direction and cross-members 30 extending between the rails 28 in a cross-vehicle 10 direction. As another example, the body 24 and frame 26 may be of a unibody 24 construction. In the unibody 24 construction, the body 24, e.g., rockers, serves as the vehicle 10 frame 26, and the body 24 (including the rockers, pillars, roof rails 28, etc.) is unitary, i.e., a continuous one-piece unit. Alternatively, the body 24 and frame 26 may have any suitable construction. The body 24 and/or the frame 26 may be formed of any suitable material, for example, steel, aluminum, etc.

Figure 2:
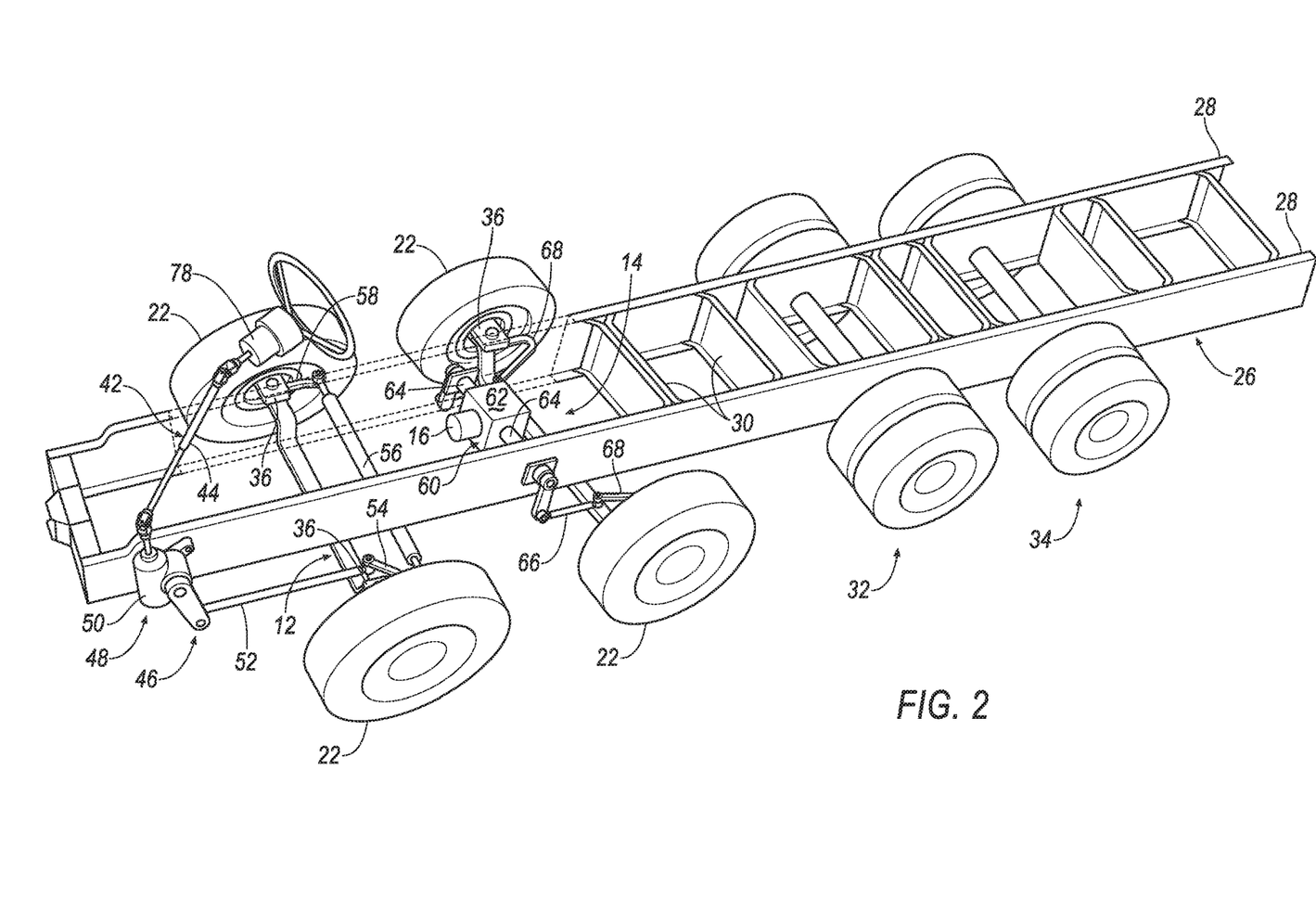
FIG. 2 is a perspective view of a portion of the vehicle with a steering assembly connected to the first steered axle and an electric steering motor connected to the second steering axle.

With reference to FIG. 2, the vehicle 10 includes a plurality of axles, including the first steered axle 12 and the second steered axle 14. In the example, shown in the figures the vehicle 10 may also include a third axle 32 and a fourth axle 34. In an example, where the vehicle 10 includes axles in addition to the first steered axle 12 and the second steered axle 14, the vehicle 10 may include any suitable number of axles in addition to the first steered axle 12 and the second steered axle 14. In the example shown in the figures, the second steered axle 14 is between the first steered axle 12 and the third axle 32.

The wheels 22 are connected to each of the axles. The first steered axle 12 steers the wheels 22 on the first steered axle 12, and the second steered axle 14 steers the wheels 22 on the second steered axle 14. Specifically, the first steered axle 12 and the second steered axle 14 may each include stub axles 36 to which the wheels 22 are mounted. As described further below, the stub axles 36 are rotated about vertical axes to steer the wheels 22. Specifically, the first steered axle 12 and the second steered axle 14 each include an axle beam 38, and the stub axles 36 are rotatably supported by the axle beam 38 by a kingpin 40. The axle beam 38s may be fixed to the frame 26, e.g., to the rails 28 and/or cross-members 30.

The wheels 22 of the vehicle 10 control a direction of the vehicle 10. A position of the wheels 22, e.g., turned to a right or a left relative to a forward driving direction, controls the driving direction, e.g., when the wheels 22 are turned to the right the vehicle 10 may be navigate to the right. The position of the wheels 22 defines the steering angle, i.e., an amount of deviation of the wheels 22 to the right or left of center.

One or both of the third axle 32 and the fourth axle 34 may be a straight axle. In other words, the wheels 22 are fixed in a centered position, i.e., the wheels 22 are not rotatable about a vertical axis to steer the wheels 22. In the example shown in the figures, both the third axle 32 and the fourth axle 34 are straight axles. As another example, one or both of the third axle 32 and the fourth axle 34 may be a steered axle, i.e., may steer the wheels 22 as described above.

At least one of the axles 12, 14, 32, 34 is connected to a propulsion motor (not shown) of the vehicle 10, i.e., a motor that propels the vehicle 10 by rotating the wheels 22. In other words, one of the axles, more than one of the axles, or all of the axles are connected to the propulsion motor. The axle(s) may be connected to the propulsion motor in any suitable fashion, e.g., in known fashions. For example, the axle(s) may be connected to the propulsion motor with a driveline (not shown). The propulsion motor may be of any suitable type, e.g., an internal combustion engine, electric, etc.

With reference to FIGS. 2-4B, the vehicle 10 includes a steering assembly 42 including the steering wheel 22. The steering wheel 22 allows an operator to steer the vehicle 10 by transmitting rotation of the steering wheel 22 to movement of the first steered axle 12 and the second steered axle 14. The steering wheel 22 may include, for example, a rigid ring to be grasped by the driver of the vehicle 10. The steering assembly 42 may include a steering column 44. The steering column 44 transfers rotation of the steering wheel 22 to the first steered axle 12.

With reference to FIGS. 2-4B, the vehicle 10 includes a first steering system 46 that steers the first axle. The first steering system 46 is connected to the steering assembly 42, e.g., the steering column 44 to receive input from the steering wheel 22 to the steering column 44. The first steering system 46 includes components, e.g., mechanical and hydraulic, connecting the steering assembly 42 to the first steered axle 12, i.e., the stub axles 36 of the first steered axle 12 to steer the stub axles 36.

In the example shown in the figures, the first steering system 46 includes a steering box 48 connected to the steering column 44 for receiving rotation from the steering wheel 22 by the steering column 44. The steering box 48 includes a hydraulic actuator 50 connected to the steering column 44 and connected to the first steered axle 12. The hydraulic actuator 50 is between the steering wheel 22 and the first steered axle 12.

A drag arm 52 is connected to the steering box 48. A drag link arm 54 connects to the drag 52 arm and one of the stub axles 36 at rotational connections. A track rod 56 connects the two stub axles 36. Tie rods 58 connect the track rod 56 to the stub axles 36 at rotational connections.

When the steering wheel 22 is turned, the steering column 44 provides rotational input to the hydraulic actuator 50, which moves pushes/pulls the drag arm 52, which rotates the drag link arm 54 and rotates the associated stub axle 36 about the kingpin 40. This moves the associated tie rod 58, which pushes/pulls the track rod 56 to move the other tie rod 58 and rotate the other stub axle 36 about its kingpin 40. The steering of the first steered axle 12 may be entirely mechanical and/or hydraulic.

With reference to FIGS. 2-5, the vehicle 10 includes a second steering system 60 that steers the second steered axle 14. Specifically, the second steering system 60 includes the electric steering motor 16. The electric steering motor 16 is connected to at least one of the wheels 22 of the second steered axle 14, i.e., indirect engagement by intermediate components (as shown in the figures) or through direct engagement between the electric steering motor 16 and the wheels 22. In the example shown in the figures, the electric steering motor 16 is connected to both of the wheels 22 of the second steered axle 14 to steer both wheels 22 of the second steered axle 14. Specifically, the electric steering motor 16 is connected to the stub axles 36 to rotate the stub axles 36 about the vertical axis to steer the wheels 22. One example embodiment of the connection between the electric steering motor 16 and the wheels 22 is shown in FIG. 4A and another embodiment of the connection between the electric steering motor 16 and the wheels 22 is shown in FIG. 4B. The examples in the figures show a single electric steering motor 16, and alternatively, the vehicle 10 may include more than one electric steering motor 16, e.g., separate electric steering motor 16s for different ones of the axles and/or separate electric steering motor 16s for individual ones of the wheels 22.

The electric steering motor 16 steers the wheels 22 on the second steered axle 14. The electric steering motor 16 steers the second steered axle 14 independently of the first steered axle 12. Specifically, the wheels 22 on the first steered axle 12 are steered by the first steering system 46 described above, e.g., by rotation of the steering wheel 22 transmitted through the hydraulic and mechanical movement of the components of the first steering system 46 to the wheels 22 on the first steered axle 12; the wheels 22 on the second steered axle 14 are steered by the electric steering motor 16, and the electric steering motor 16 may steer the wheels 22 on the second steered axle 16 to a different steering angle than the steering angle of the wheels 22 on the first steered axle 14. Specifically, the wheels 22 on the second steered axle 14 are steered by the electric steering motor 16 based on a calculation, as described below, and the calculation may provide a desired steering angle for the wheels 22 on the second steered axle 14 that is different than the steering angle of the wheels 22 on the first steered axle 12, in which case the electric steering motor 16 steers the wheels 22 on the second steered axle 14 independently of the steering angle of the wheels 22 on the first steered axle 12.

The electric steering motor 16 may be a stepper motor. Alternatively, the electric steering motor 16 may be of any suitable type. The electric steering motor 16 coverts electricity into mechanical rotation to steer the wheels 22. The electric steering motor 16, for example, may be powered by a battery of the vehicle 10.

The electric steering motor 16 is fixed to the frame 26. In other words, the electric steering motor 16 moves as a unit with the frame 26. The electric steering motor 16 may be connected to one or both of the rails 28, i.e., directly or indirectly through an intermediate component such as one or more of the cross-members 30.

The second steering system 60 may include a gearbox 62 connected to the electric steering motor 16. The gearbox 62 receives input torque from the electric steering motor 16, and coverts the input torque to a desired output torque to steer the wheels 22. The gearbox 62 includes a housing (not numbered) and gears (not shown) in the housing to convert the input torque to the output torque.

The electric steering motor 16 may be connected directly to the housing of the gearbox 62. The housing of the gearbox 62 is fixed to the frame 26 and may be connected to one or both of the rails 28, i.e., directly or indirectly through an intermediate component such as one or more of the cross-members 30.

In the example shown in FIGS. 2-4A, the gearbox 62 includes two output shafts 64 each extending through one of the rails 28 of the frame 26. One of the output shafts 64 is connected to one of the wheels 22 of the second steered axle 14 and the other output shaft 64 is connected to the other of the wheels 22 of the second steered axle 14. In other words, the electric steering motor 16 is operably connected independently to both of the wheels 22, i.e., steers one of the wheels 22 with one output shaft 64 and steers the other of the wheels 22 with the other output shaft 64.

Figure 3:
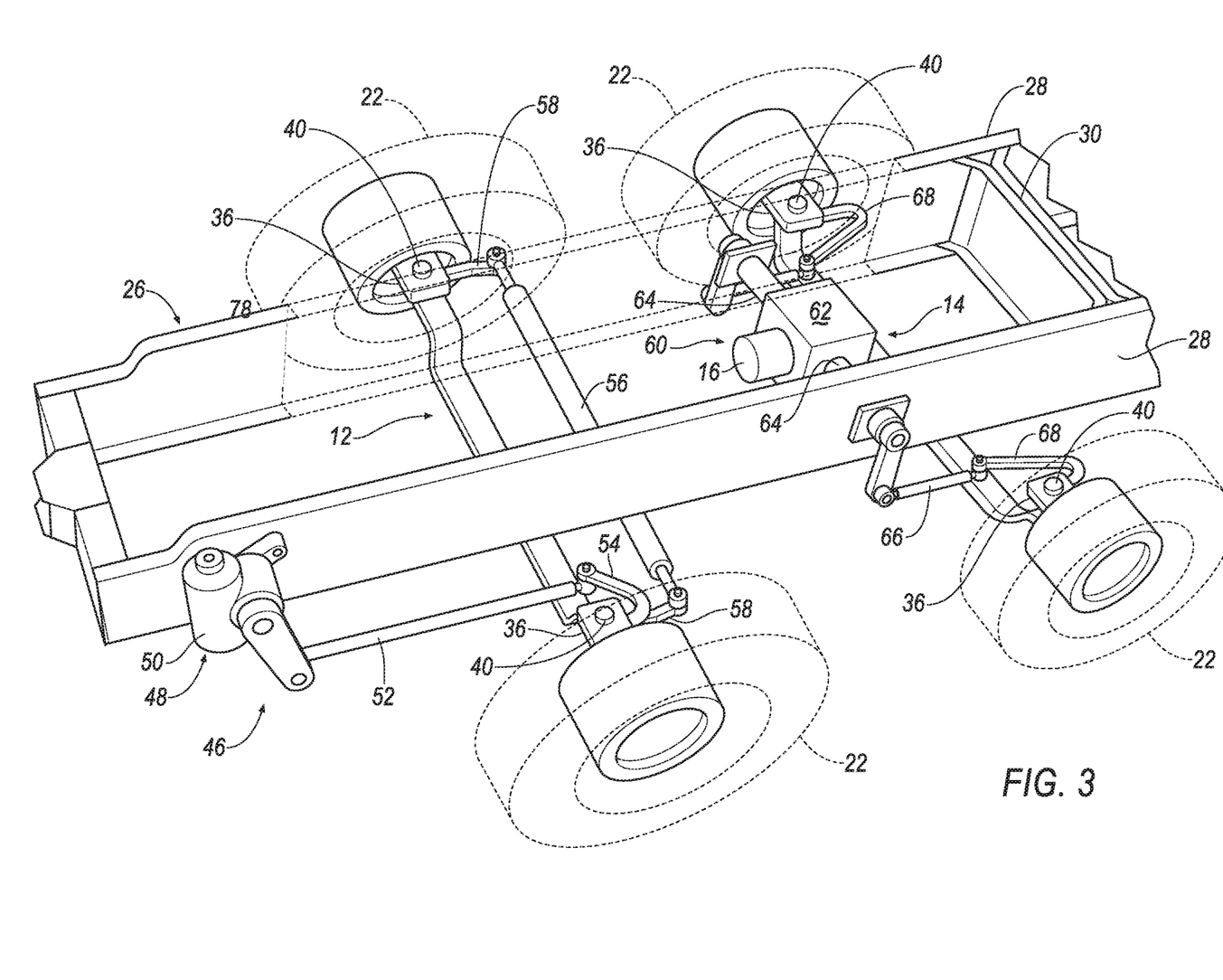
FIG. 3 is an enlarged view of a portion of FIG. 2.
Figure 4A:
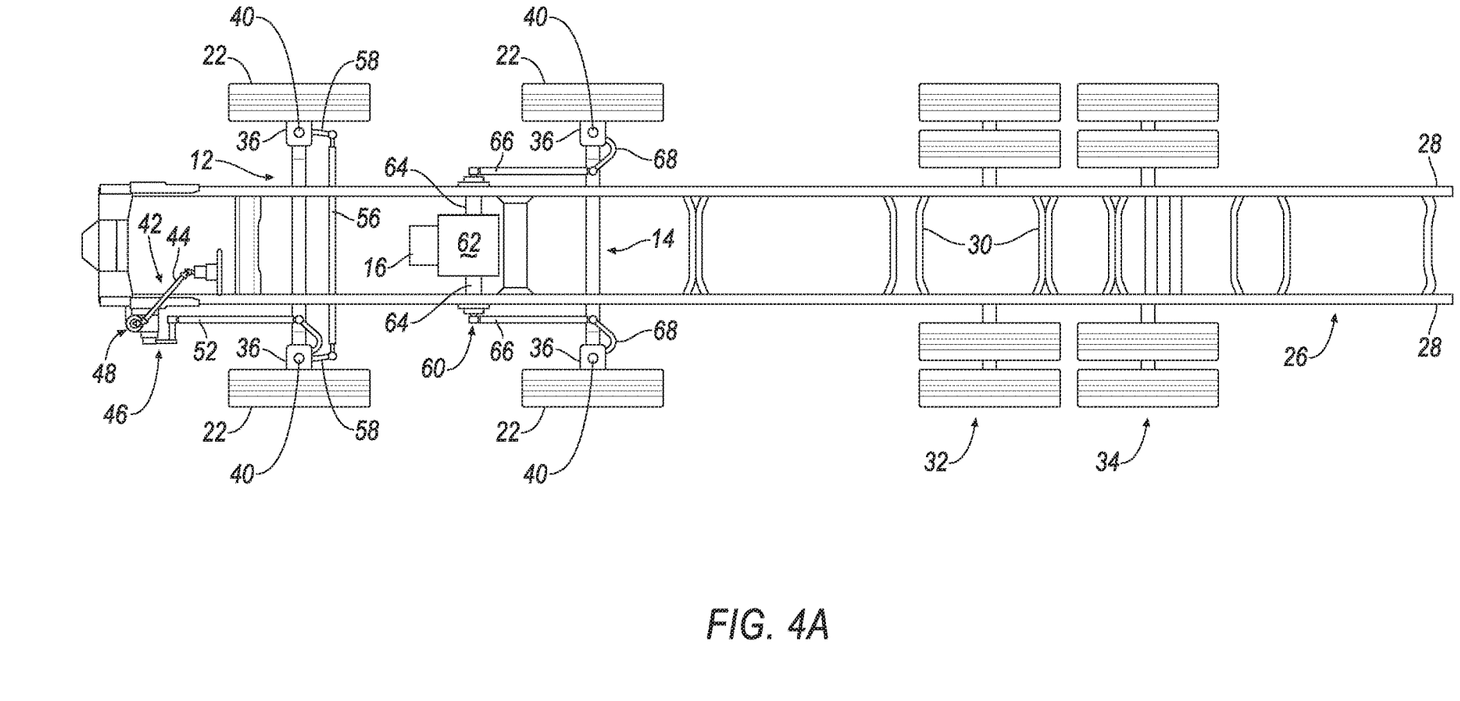
FIG. 4A is a top vie of a portion of the vehicle in FIG. 2.

Specifically, each of the output shafts 64 is connected to a link 66, which is connected to an arm 68 at a rotational connection. The arm 68 is connected to the stub axle 36 at a rotational connection. When the electric steering motor 16 rotates the output shafts 64, the arms 68 move to rotates the stub axle 36 about the kingpin 40 to steer the wheels 22.

Figure 4B:
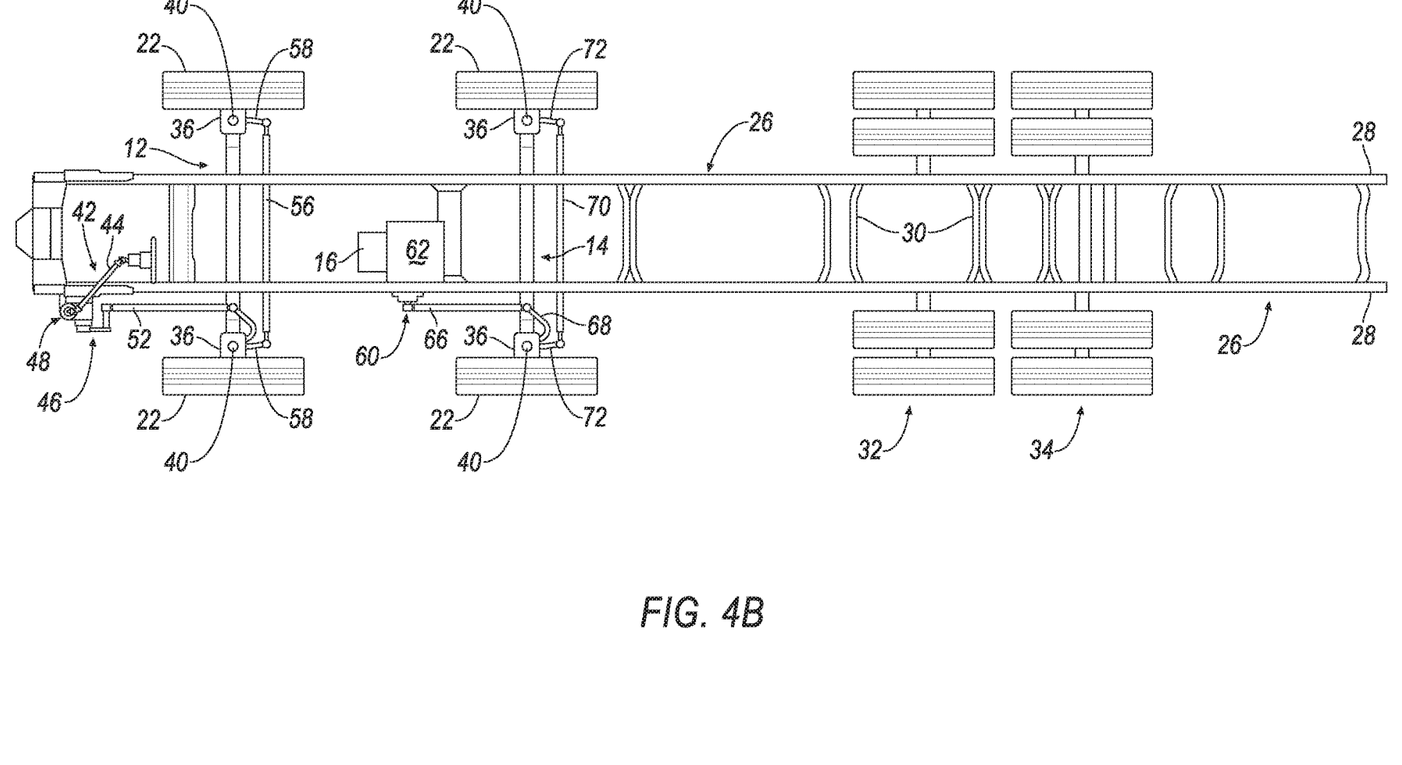
FIG. 4B is a top view of a portion of the vehicle including another example embodiment of the arrangement of the electric steering motor.

In the example shown in FIG. 4B, the gearbox 62 includes one output shaft 64 extending through one of the rails 28 of the frame 26. The output shaft 64 is connected to a link 66, which is connected to an arm 66 at a rotational connection, which is connected to one of the stub axles 36 at a rotational connection. A track rod 70 connects the two stub axles 36. Tie rods 72 connect the rack rod 70 to the stub axles 36 at rotational connections. When the electric steering motor 16 rotates the output shaft 64, the arm 66 moves to rotate the stub axle 36 about the kingpin 40, which moves the associated tie rod 72, which pushes/pulls the track rod 70 to move the other tie rod 72 and rotate the other stub axle 36 about its kingpin 40. In other words, the electric steering motor 16 steers one of the wheels 22 and a track rod 70 steers the other of the wheels 22

Figure 5:
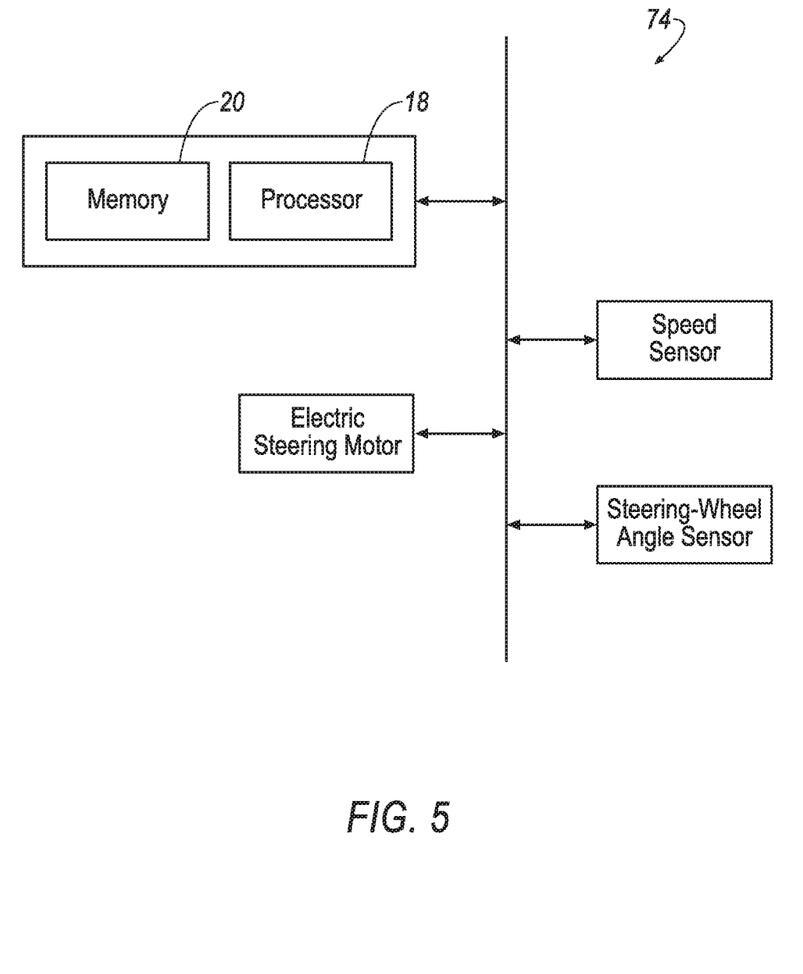
FIG. 5 is a schematic of a system of the vehicle.

With reference to FIG. 5, a system 74 of the vehicle 10 includes a steering-wheel angle sensor 76 configured to detect the rotational position of the steering wheel 22. The steering-wheel angle sensor 76 may be a known type. As examples, the steering-wheel angle sensor 76 may include a rotary encoder, a Hall-effect sensor, optical sensors, magneto-resistive sensors, etc., to measure the rotational position of the steering wheel 22. As an example, the steering-wheel angle sensor 76 may directly sense the rotational position of the steering column 44 to determine the rotational position of the steering wheel 22. The steering assembly 42 may include a housing 78 and the steering wheel 22 is rotatable relative to the housing 78. As an example, the steering column 44 may extend through the housing 78 and may be rotatable relative to the housing 78. The steering-wheel angle sensor 76 may be fixed to the housing 78 and configured to detect the rotational position of the steering wheel 22 relative to the housing 78.

The system 74 may include a speed sensor 80 configured to measure the vehicle speed, i.e., the travelling speed of the vehicle 10. The speed sensor 80 may be a known type. As an example, the speed sensor 80 may detect the rotational speed of one or more of the wheels 22 for calculation of the vehicle speed. The speed sensor 80 may include a rotary encoder, a Hall-effect sensor, optical sensors, magneto-resistive sensors, etc.

With continued reference to FIG. 5, the system 74 of the vehicle 10 includes the processor 18 and the memory 20 storing instructions executable by the processor 18 to instruct the electric steering motor 16 to steer the at least one of the wheels 22 on the second steered axle 14, e.g., to steer both wheels 22 on the second steered axle 14. The system 74 may include a computer 82 including the processor 18 and the memory 20. The computer 82 may be a microprocessor-based controller implemented via circuits, chips, or other electronic components. The memory 20 of the computer 82 may include memory 20 for storing instructions executable by the processor 18 as well as for electronically storing data and/or databases. Although one computer 82 is shown in FIG. 5 for ease of illustration, the computer 82 may include, and various operations described herein could be carried out by, one or more computers.

The system 74 may be connected to the electric steering motor 16 through a communication network 84 that may facilitate wired or wireless communication among the components of the vehicle 10, e.g., the computer 82, the electric steering motor 16, the steering-wheel angle sensor 76, etc. The communication network 84 includes hardware, such as a communication bus, for facilitating communication among the components. The communication network 84 may facilitate wired or wireless communication among the components in accordance with a number of communication protocols such as controller area network (CAN), Ethernet, WiFi, Local Interconnect Network (LIN), and/or other wired or wireless mechanisms. For example, the electric steering motor 16, the computer 82, and the sensors 76, 80 may communicate with each other through the communication network 84.

Figure 6:
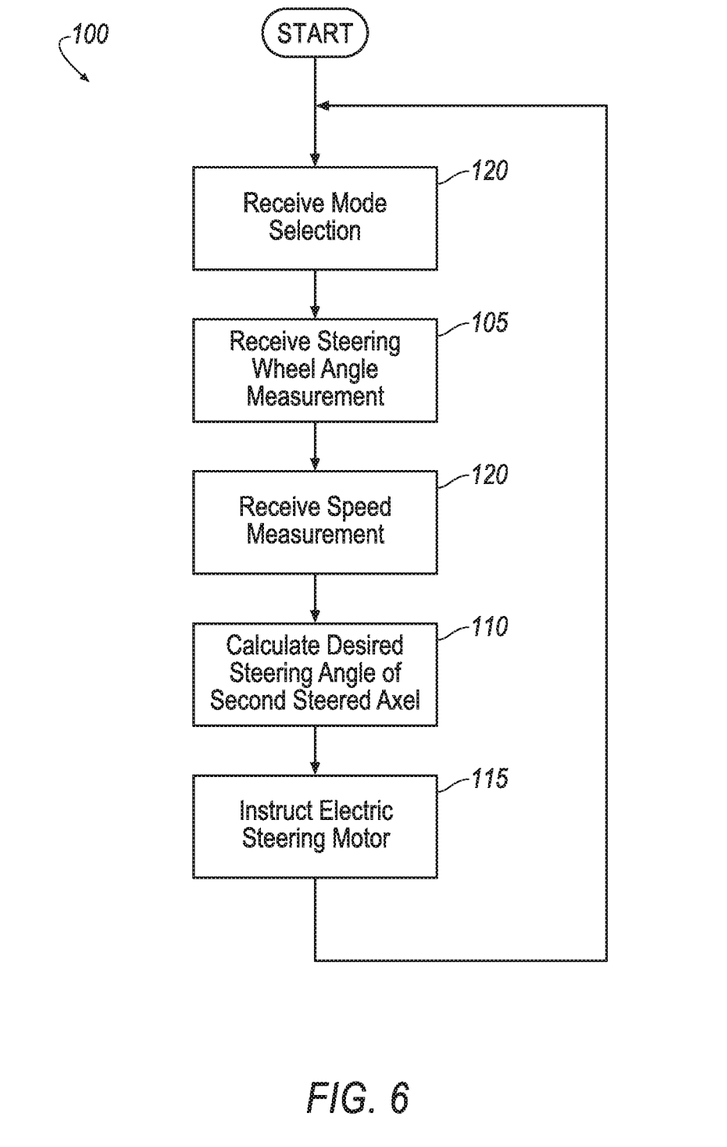
FIG. 6 is a flow chart for operation the system.

The memory 20 stores instructions executable by the processor 18 to receive a steering wheel angle measurement. With reference to FIG. 6, in block 105, the system 74 receives a steering wheel angle measurement. The steering wheel angle measurement is a measurement of the rotational position of the steering wheel 22, e.g., relative to the housing 78. For example, the steering wheel angle measurement may be measured by the steering-wheel angle sensor 76 and communicated through the communication network.

The memory 20 stores instructions executable by the processor 18 to calculate a desired steering angle of a second steered axle 14 based at least on the steering wheel angle measurement. Specifically, the memory 20 stores instructions executable by the processor 18 to instruct the electric steering motor 16 based at least on the rotational position of the steering wheel 22 measured by steering-wheel angle sensor 76. In block 110, the system calculates a desired steering angle of a second steered axle 14 based at least on the steering wheel angle measurement. As one example, the calculation of the desired steering angle may be based on a look-up table including steering wheel angle measurements and corresponding desired steering angles. As another example, the calculation of the desired steering angle may be based on an equation in which the steering wheel angle measurement is an input. In such examples, the look-up table and/or the equation may be stored in the memory 20. The desired steering angle of the second steered axle 14 resulting from the calculation may be one that reduces wear of the tires on wheels 22 by reducing or eliminating drag of wheels 22 of the second steered axle 14 during turning. The desired steering angles output from the calculation may be based on empirical data for reduced wear of the tires on the wheels 22 on the second steered axle 14.

The memory 20 stores instructions executable by the processor 18 to instruct the electric steering motor 16 to turn the second steered axle 14 to the desired steering angle independently of the steered angle of the first steered axle 12. In block 115, the system instructs the electric steering motor 16 to turn the second steered axle 14 to the desired steering angle calculated in block 110. In other words, the electric steering motor 16 steers the wheels 22, as described above, to the desires steering angle. This process is repeated during forward movement of the vehicle 10 and/or turning of the steering wheel 22. The steering of the second steered axle 14 is independent of the steered angle of the first steered axle 12 because the wheels 22 on the second steered axle 14 are steered by the electric steering motor 16 based on the calculation, and the calculation may provide a desired steering angle for the wheels 22 on the second steered axle 14 that is different than the steering angle of the wheels 22 on the first steered axle 12, in which case the electric steering motor 16 steers the wheels 22 on the second steered axle 14 independently of the steering angle of the wheels 22 on the first steered axle 14. The memory 20 stores instructions executable by the processor 18 to instruct the electric steering motor 16 to steer the second steered axle 14 at a different steering angle than a steering angle of the first steered axle 12.

The calculation of the desired steering angle in block 110 may also be based on the vehicle speed, e.g., measured by the speed sensor 80 and communicate through the communication network. The memory 20 stores instructions executable by the processor 18 to receive a vehicle speed and calculate the desired steering angle of the second steered axle 14 based at least on the vehicle speed. In block 120, the system may receive a speed measurement. In such an example, the calculation of the desired steering angle of the second steered axle 14 described above in block 110 may be based on a look-up table including vehicle speed in addition to the steering wheel angle measurements and corresponding desired steering angles, and/or may be based on an equation in which the vehicle speed is a n input along with the steering wheel angle measurement.

The calculation of the desire steering angle in block 110 may also be based on a mode selected by a user, e.g., a driver of the vehicle 10 through a user interface in the passenger compartment of the vehicle 10. The memory 20 stores instructions executable by the processor 18 to receive a mode selection and calculate the desired steering angel of the second steered axle 14 based at least on the mode selection. In block 120, the system 74 may receive the mode selection. Specifically, the memory 20 may store a plurality of modes based on environmental road conditions such as wetness, temperature, frozen precipitation (snow, ice, sleet, etc.), etc.; road consistency such as blacktop, gravel, sand, etc.; load size and/or weight; etc. Each of the modes may have a different calculation in block 110, e.g., different look-up tables and/or different equations. Based on these different calculations, the desired steering angle of the second steered 14 axle may be different based selection of different modes. The substance of the look-up tables and/or equations may be based on empirical data empirical data for reduced wear on the wheels 22 on the second steered axle 14.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a first steered axle;
   a second steered axle behind the first steered axle and steerable independently from the first steered axle;
   wheels on the second steered axle;
   an electric steering motor connected to the at least one of the wheels; and
   a gearbox connected to the electric steering motor, the gearbox including a shaft connected to one of the wheels and another shaft connected to the other of the wheels.

2. The vehicle as set forth in claim 1, further comprising a processor and a memory storing instructions executable by the processor to instruct the electric steering motor to steer the at least one of the wheels.

3. The vehicle as set forth in claim 2, further comprising a steering-wheel angle sensor configured to measure a rotational position of a steering wheel, wherein the memory stores instructions executable by the processor to instruct the electric steering motor based at least on the rotational position of the steering wheel measured by steering-wheel angle sensor.

4. The vehicle as set forth in claim 3, wherein the memory stores instructions executable by the processor to instruct the electric steering motor based at least on a speed of the vehicle.

5. The vehicle as set forth in claim 3, further comprising a housing and a steering wheel rotatable relative to the housing, the steering-wheel angle sensor being fixed to the housing and configured to detect the rotational position of the steering wheel relative to the housing.

6. The vehicle as set forth in claim 2, wherein the processor instructs the electric steering motor to steer the second steered axle at a different steering angle than a steering angle of the first steered axle.

7. The vehicle as set forth in claim 1, further comprising a hydraulic actuator connected to the first steered axle.

8. The vehicle as set forth in claim 7, further comprising a steering wheel, the hydraulic actuator being between the steering wheel and the first steered axle.

9. The vehicle as set forth in claim 1, further comprising a third axle, the second steered axle being between the first steered axle and the third axle.

10. The vehicle as set forth in claim 1, further comprising a frame, the electric steering motor being fixed to the frame.

11. The vehicle as set forth in claim 1, wherein the electric steering motor is operably connected independently to both of the wheels.

12. The vehicle as set forth in claim 1, further comprising a stub axle connected to each of the wheels, a link connecting one of the stub axles to one of the shafts, and another link connecting the other of the stub axles to the other of the shafts.

13. The vehicle as set forth in claim 1, further comprising a track rod between the wheels, wherein the steering motor steers one of the wheels and a track rod steers the other of the wheels.

14. The vehicle as set forth in claim 1, further comprising a stub axle connected to each wheel, the electric steering motor being connected to the stub axle.

15. The vehicle as set forth in claim 14, further comprising a link between the electric steering motor and the stub axle.

16. A system comprising:
a first steered axle;
a second steered axle behind the first steered axle and steerable independently from the first steered axle;
wheels on the second steered axle;
an electric steering motor connected to the at least one of the wheels;
a gearbox connected to the electric steering motor, the gearbox including a shaft connected to one of the wheels and another shaft connected to the other of the wheels; and
a processor and a memory storing instructions executable by the processor to:
receive a steering wheel angle measurement;
calculate a desired steering angle of a second steered axle based at least on the steering wheel angle measurement, the second steered axle being behind a first steered axle; and
instruct a motor to turn the second steered axle to the desired steering angle independently of a steered angle of the first steered axle.

17. The system as set forth in claim 16, wherein the memory stores instructions executable by the processor to receive a vehicle speed and calculate the desired steering angle of the second steered axle based at least on the vehicle speed.

18. The system as set forth in claim 16, wherein the memory stores instructions executable by the processor to receive a mode selection and calculate the desired steering angel of the second steered axle based at least on the mode selection.

* * * * *